(12) United States Patent
Zuo et al.

(10) Patent No.: US 12,141,063 B2
(45) Date of Patent: Nov. 12, 2024

(54) EFFICIENT WRITE-BACK FOR JOURNAL TRUNCATION

(71) Applicant: VMware LLC, Palo Alto, CA (US)

(72) Inventors: Jiaqi Zuo, Santa Clara, CA (US);
Junlong Gao, Santa Clara, CA (US);
Wenguang Wang, Santa Clara, CA (US); Eric Knauft, San Francisco, CA (US); Hardik Singh Negi, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 133 days.

(21) Appl. No.: 17/929,197

(22) Filed: Sep. 1, 2022

(65) Prior Publication Data

US 2024/0078179 A1    Mar. 7, 2024

(51) Int. Cl.
*G06F 12/0804*    (2016.01)
*G06F 12/0882*    (2016.01)

(52) U.S. Cl.
CPC ...... *G06F 12/0804* (2013.01); *G06F 12/0882* (2013.01)

(58) Field of Classification Search
CPC .......................... G06F 12/0804; G06F 12/0882
See application file for complete search history.

(56) References Cited

U.S. PATENT DOCUMENTS

| | | | |
|---|---|---|---|
| 10,705,918 B1* | 7/2020 | Hu | G06F 16/215 |
| 10,725,967 B1 | 7/2020 | Natanzon | |
| 11,567,872 B1 | 1/2023 | Pillai | |
| 2011/0252192 A1* | 10/2011 | Busch | G06F 16/23 |
| | | | 711/E12.016 |
| 2012/0011106 A1 | 1/2012 | Reid | |
| 2016/0313943 A1 | 10/2016 | Hashimoto | |
| 2016/0371190 A1 | 12/2016 | Romanovskiy | |
| 2017/0032005 A1 | 2/2017 | Zheng | |
| 2018/0373743 A1* | 12/2018 | Korotkov | G06F 16/2282 |
| 2020/0019620 A1 | 1/2020 | Sarda | |
| 2020/0175074 A1 | 6/2020 | Li | |
| 2021/0004326 A1* | 1/2021 | Kolli | G06F 11/3055 |
| 2021/0294499 A1 | 9/2021 | Wang | |
| 2021/0349850 A1 | 11/2021 | Carey | |

* cited by examiner

*Primary Examiner* — Prasith Thammavong
(74) *Attorney, Agent, or Firm* — King Intellectual Asset Management

(57) ABSTRACT

A method for efficient write-back for journal truncation is provided. A method includes maintaining a journal in a memory of a computing system including a plurality of records. Each record indicates a transaction associated with one or more pages in an ordered data structure and maintaining a dirty list including an entry for each page indicated by a record in the journal. Each entry in the dirty list includes a respective first log sequence number (LSN) associated with a least recent record of the plurality of records that indicates the page and a respective second LSN associated with a most recent record of the plurality of records that indicates the page. The method includes determining to truncate the journal. The method includes identifying one or more records, of the plurality of records, from the journal to write back to a disk, where the identifying is based on the dirty list.

20 Claims, 13 Drawing Sheets

EFFICIENT WRITE-BACK FOR JOURNAL TRUNCATION

BACKGROUND

In the field of data storage, a storage area network (SAN) is a dedicated, independent high-speed network that interconnects and delivers shared pools of storage devices to multiple servers. A virtual SAN (VSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The VSAN architecture may be a two-tier datastore including a performance tier for the purpose of read caching and write buffering and a capacity tier for persistent storage.

The VSAN datastore may manage storage of virtual disks at a block granularity. For example, VSAN may be divided into a number of physical blocks (e.g., 4096 bytes or "4K" size blocks), each physical block having a corresponding physical block address (PBA) that indexes the physical block in storage. Physical blocks of the VSAN may be used to store blocks of data (also referred to as data blocks) used by VMs, which may be referenced by logical block addresses (LBAs). Each block of data may have an uncompressed size corresponding to a physical block. Blocks of data may be stored as compressed data or uncompressed data in the VSAN, such that there may or may not be a one to one correspondence between a physical block in VSAN and a data block referenced by an LBA.

Modern storage platforms, including the VSAN datastore, may enable snapshot features for backup, archival, or data protections purposes. Snapshots provide the ability to capture a point-in-time state and data of a VM to not only allow data to be recovered in the event of failure but restored to known working points. Snapshots may not be stored as physical copies of all data blocks, but rather may entirely, or in part, be stored as pointers to the data blocks that existed when the snapshot was created.

Each snapshot may include its own snapshot metadata, e.g., mapping of LBAs to PBAs, stored concurrently by several compute nodes (e.g., metadata servers). The snapshot metadata may be stored as key-value data structures to allow for scalable input/output (I/O) operations. In particular, a unified logical map B+ tree may be used to manage logical extents for the logical address to physical address mapping of each snapshot, where an extent is a specific number of contiguous data blocks allocated for storing information. A B+ tree is a multi-level data structure having a plurality of nodes, each node containing one or more key-value pairs stored as tuples (e.g., <key, value>). A key is an identifier of data and a value is either the data itself or a pointer to a location (e.g., in memory or on disk) of the data associated with the identifier.

In certain embodiments, the logical map B+ tree may be a copy-on-write (COW) B+ tree (also referred to as an append-only B+ tree). COW techniques improve performance and provide time and space efficient snapshot creation by only copying metadata about where the original data is stored, as opposed to creating a physical copy of the data, when a snapshot is created. Accordingly, when a COW approach is taken and a new child snapshot is to be created, instead of copying the entire logical map B+ tree of the parent snapshot, the child snapshot shares with the parent and, in some cases, ancestor snapshots, one or more extents by having a B+ tree index node, exclusively owned by the child, point to shared parent and/or ancestor B+ tree nodes. Updates to the logical map COW B+ tree can be recorded in a write-ahead-log (WAL). The changes to the logical map COW B+ tree may be kept in memory until they are persisted to storage. Once a COW B+ tree operation is persisted to storage, the corresponding record may be removed from the WAL.

The WAL is one example of an in-memory journal that contains metadata that logs events, such as changes (e.g., adding, removing, or changing pages) to a data structure. A journal may also be referred to as a cache, a log, or transaction log. Removal of records from the journal may be referred to as "journal truncation." Journal truncation frees cache space for accepting new journal records.

The effects of the journal records are represented by the modified pages in the journal. Pages in one journal record may be further modified by a change in a subsequent transaction in the journal. These modified pages in the journal are referred to as "dirty" pages that are candidates for journal truncation.

To ensure crash consistency, the system persists the effects of journal records on to the disk before truncating the records from the in-memory journal. Persisting the effects of journal records on to the disk is referred to as "write back." Because persisting the effects of the dirty cache entries and deleting the entries from the journal have input/output (I/O) costs, it is desirable to efficiently write back dirty pages to minimize the I/O costs.

Accordingly, there is a need in the art for improved techniques to efficiently identify dirty cache entries for journal truncation.

It should be noted that the information included in the Background section herein is simply meant to provide a reference for the discussion of certain embodiments in the Detailed Description. None of the information included in this Background should be considered as an admission of prior art.

DETAILED DESCRIPTION

Figure 1:
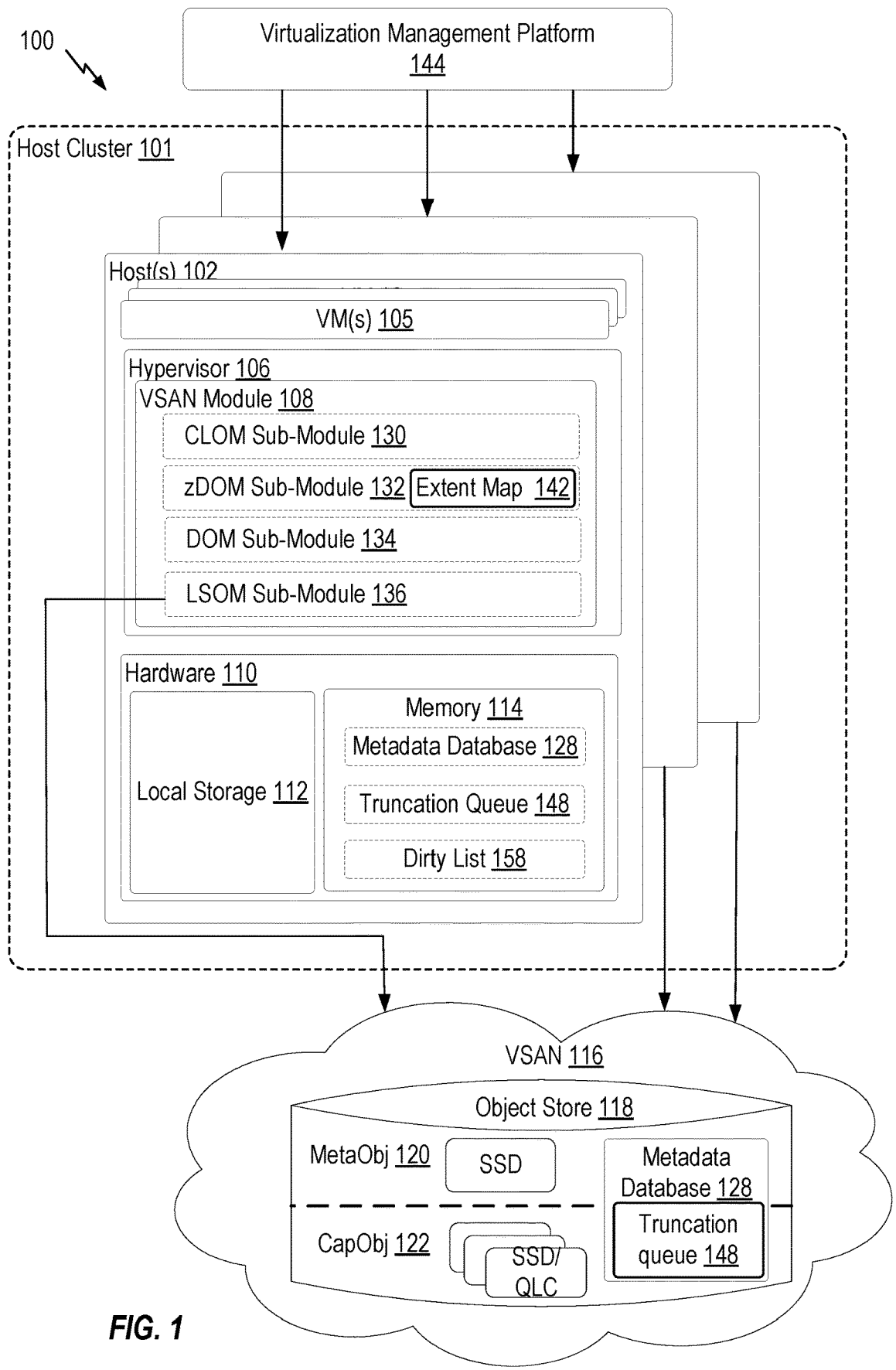
FIG. 1 is a diagram illustrating an example computing environment in which embodiments of the present application may be practiced.

Aspects of the present disclosure introduce techniques for efficient write back for journal truncation.

In some embodiments, the system maintains a dirty list. A journal includes records of transactions to an ordered data structure. Each record is associated with an LSN and one or more pages affected by a transaction associated with the LSN. For example, a transaction may include adding a page, removing a page, or modifying a page in the ordered data structure. When a transaction is buffered, the transaction may assigned a monotonically increasing LSN value. When a record is added to the journal, one or more entries in the dirty list are created or updated. For example, for each page associated with the record, if the page is not already included in any entry in the dirty list, then a new entry is created in the dirty list. The entry includes a reference to the page, a dirty LSN value, firstDirtyLSN, indicating the LSN in the record being added to the journal, and the PageLSN also indicating the LSN in the record being added. That is, the dirty LSN value represents the LSN of the record which first references that page. If the page is already included in an entry in the dirty list, then the system updates the PageLSN of that entry to the LSN in the record being added to the journal.

In some embodiments, the dirty list is a linked list. For example, the dirty list has a head (e.g., the entry associated with the largest LSN) and a tail (e.g., the entry associated with the smallest LSN). Each entry may be stamped, e.g., associated with pointers, to the next and previous entries in the dirty list. Accordingly, when an entry is removed from the dirty list, the pointers of the previous and next entries to the removed entries are updated to point to each other. Similarly, when a new entry is added to the dirty list, pointers are added to the entry, and pointers are updated in the previous entry.

During journal truncation, the system identifies an upToLSN value for the journal truncation. The upToLSN represents a largest LSN to be deleted from the journal. The system will only remove records from the journal associated with an LSN equal to or smaller than the upToLSN. In some embodiments, the upToLSN and the dirty are used to determine whether to write back a record before truncation of the record. For example, the system may start at the tail of the dirty list and identify whether the dirty LSN value of the entry is smaller than the upToLSN value. Where the dirty LSN value of an entry is smaller than the upToLSN value, the system may determine that the respective record associated with the dirty LSN value should be written back. Where the dirty LSN value of an entry is greater than the upToLSN value, the system may determine that the respective record associated with the dirty LSN value does not need to be written back, e.g., because the record will not be truncated.

In some embodiments, the system further determines whether the page can be written back by comparing the PageLSN value of the entry to a FlushedLSN value in the journal. The FlushedLSN is largest LSN that has been flushed from the buffer so far. The FlushedLSN is updated every time a WAL buffer is written to the disk.

In some embodiments, after writing back a journal record to the disk, the associated entry may be removed from the dirty list and the record may be truncated from the journal. When the entry is removed from the dirty list, the dirty LSN value for that entry may be set to an invalid LSN. For example, to indicate the entry is no longer part of the dirty list, the dirtyLSN value may be set to an invalid LSN value.

In some embodiments, where the entry in the dirty list is associated with a hot page, the entry is skipped. That is, the record is not written back to the disk or truncated from the journal, and the entry is not removed from the dirty list, even where the entry has a dirty LSN value that is equal to or smaller than the upToLSN value. The entry in the dirty list is associated with a hot page when the page associated with the entry is referenced by a latest record in the journal (that is, the page is affected by the most recent transaction).

In some embodiments, where there is a hot page, the entry may be removed from the dirty list, but the respective record with the LSN of the dirty LSN of the entry is not truncated from the journal.

Though certain aspects described herein are described with respect to the WAL and B+ trees, the aspects may be applicable to any suitable metadata journal associated with any ordered data structure.

FIG. 1 is a diagram illustrating an example computing environment 100 in which embodiments may be practiced. As shown, computing environment 100 may include a distributed object-based datastore, such as a software-based "virtual storage area network" (VSAN) environment, VSAN 116, that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of VSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, VSAN 116 is configured to store virtual disks of VMs 105 as data blocks in a number of physical blocks, each physical block having a PBA that indexes the physical block in storage. VSAN module 108 may create an "object" for a specified data block by backing it with physical storage resources of an object store 118 (e.g., based on a defined policy).

VSAN 116 may be a two-tier datastore, storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data.

Each host 102 may include a storage management module (referred to herein as a VSAN module 108) in order to automate storage management workflows (e.g., create objects in MetaObj 120 and CapObj 122 of VSAN 116, etc.) and provide access to objects (e.g., handle I/O operations to objects in MetaObj 120 and CapObj 122 of VSAN 116, etc.) based on predefined storage policies specified for objects in object store 118.

A virtualization management platform 144 is associated with host cluster 101. Virtualization management platform 144 enables an administrator to manage the configuration and spawning of VMs 105 on various hosts 102. As illustrated in FIG. 1, each host 102 includes a virtualization layer or hypervisor 106, a VSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Each hypervisor 106, through its corresponding VSAN module 108, provides access to storage resources located in hardware 110 (e.g., storage) for use as storage for virtual disks (or portions thereof) and other related files that may be accessed by any VM 105 residing in any of hosts 102 in host cluster 101.

VSAN module 108 may be implemented as a "VSAN" device driver within hypervisor 106. In such an embodiment, VSAN module 108 may provide access to a conceptual "VSAN" through which an administrator can create a number of top-level "device" or namespace objects that are backed by object store 118 of VSAN 116. By accessing application programming interfaces (APIs) exposed by VSAN module 108, hypervisor 106 may determine all the top-level file system objects (or other types of top-level device objects) currently residing in VSAN 116.

Each VSAN module 108 (through a cluster level object management or "CLOM" sub-module 130) may communicate with other VSAN modules 108 of other hosts 102 to create and maintain an in-memory metadata database 128 (e.g., maintained separately but in synchronized fashion in memory 114 of each host 102) that may contain metadata describing the locations, configurations, policies and relationships among the various objects stored in VSAN 116. Specifically, in-memory metadata database 128 may serve as a directory service that maintains a physical inventory of VSAN 116 environment, such as the various hosts 102, the storage resources in hosts 102 (e.g., SSD, NVMe drives, magnetic disks, etc.) housed therein, and the characteristics/capabilities thereof, the current state of hosts 102 and their corresponding storage resources, network paths among hosts 102, and the like. In-memory metadata database 128 may further provide a catalog of metadata for objects stored in MetaObj 120 and CapObj 122 of VSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by VSAN module 108 on host 102, for example, when a user (e.g., an administrator) first creates a virtual disk for VM 105 as well as when VM 105 is running and performing I/O operations (e.g., read or write) on the virtual disk.

VSAN module 108, by querying its local copy of in-memory metadata database 128, may be able to identify a particular file system object (e.g., a virtual machine file system (VMFS) file system object) stored in object store 118 that may store a descriptor file for the virtual disk. The descriptor file may include a reference to a virtual disk object that is separately stored in object store 118 of VSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by VSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host 102.

In some embodiments, VSAN module 108 is configured to maintain a dirty list 158, as described in more detail below with respect to FIGS. 5-12. In some embodiments, VSAN module 108 is configured to write back records from the journal (e.g., WAL) for journal truncation according to the dirty list 158, as described in more detail below with respect to FIGS. 5-12.

In some embodiments, VSAN module 108 is configured to maintain an incremental truncation queue 148, as described in more detail below with respect to FIG. 13. In some embodiments, VSAN module 108 is configured to truncate the journal (e.g., WAL) according to the incremental truncation queue 148, as described in more detail below with respect to FIG. 13.

Various sub-modules of VSAN module 108, including, in some embodiments, CLOM sub-module 130, distributed object manager (DOM) sub-module 134, zDOM sub-module 132, and/or local storage object manager (LSOM) sub-module 136, handle different responsibilities. CLOM sub-module 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in object store 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. The storage policy may define attributes such as a failure tolerance, which defines the number of host and device failures that a VM can tolerate. A redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of VSAN 116 datastore. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). Including RAID 5 and RAID 6 configurations, each stripe may also include one or more parity blocks. Accordingly, CLOM sub-module 130, may be responsible for generating a virtual disk blueprint describing a RAID configuration.

CLOM sub-module 130 may communicate the blueprint to its corresponding DOM sub-module 134, for example, through zDOM sub-module 132. DOM sub-module 134 may interact with objects in VSAN 116 to implement the blueprint by allocating or otherwise mapping component objects of the virtual disk object to physical storage locations within various hosts 102 of host cluster 101. DOM sub-module 134 may also access in-memory metadata database 128 to determine the hosts 102 that store the component objects of a corresponding virtual disk object and the paths by which those hosts 102 are reachable in order to satisfy the I/O operation. Some or all of metadata database 128 (e.g., the mapping of the object to physical storage locations, etc.) may be stored with the virtual disk object in object store 118.

When handling an I/O operation from VM 105, due to the hierarchical nature of virtual disk objects in certain embodiments, DOM sub-module 134 may further communicate across the network (e.g., a local area network (LAN), or a wide area network (WAN)) with a different DOM sub-module 134 in a second host 102 (or hosts 102) that serves as the coordinator for the particular virtual disk object that is stored in local storage 112 of the second host 102 (or hosts 102) and which is the portion of the virtual disk that is subject to the I/O operation. If VM 105 issuing the I/O operation resides on a host 102 that is also different from the coordinator of the virtual disk object, DOM sub-module 134 of host 102 running VM 105 may also communicate across the network (e.g., LAN or WAN) with the DOM sub-module 134 of the coordinator. DOM sub-modules 134 may also similarly communicate amongst one another during object creation (and/or modification).

Each DOM sub-module 134 may create their respective objects, allocate local storage 112 to such objects, and advertise their objects in order to update in-memory metadata database 128 with metadata regarding the object. In order to perform such operations, DOM sub-module 134 may interact with a local storage object manager (LSOM) sub-module 136 that serves as the component in VSAN module 108 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested.

zDOM sub-module 132 may be responsible for caching received data in the performance tier of VSAN 116 (e.g., as a virtual disk object in MetaObj 120) and writing the cached data as full stripes on one or more disks (e.g., as virtual disk objects in CapObj 122). To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance. For example, zDOM sub-module 132 may do this full stripe writing to minimize a write amplification effect. Write amplification, refers to the phenomenon that occurs in, for example, SSDs, in which the amount of data written to the memory device is greater than the amount of information requested to be stored by host 102. Write amplification may differ in different types of writes. Lower write amplification may increase performance and lifespan of an SSD.

In some embodiments, zDOM sub-module 132 performs other datastore procedures, such as data compression and hash calculation, which may result in substantial improvements, for example, in garbage collection, deduplication, snapshotting, etc. (some of which may be performed locally by LSOM sub-module 136).

In some embodiments, zDOM sub-module 132 stores and accesses an extent map 142. Extent map 142 provides a mapping of logical block addresses (LBAs) to physical block addresses (PBAs), or LBAs to middle block addresses (MBAs) to PBAs. Each physical block having a corresponding PBA may be referenced by one or more LBAs.

In certain embodiments, for each LBA, VSAN module 108, may store in a logical map of extent map 142, at least a corresponding PBA. The logical map may include an LBA to PBA mapping table. For example, the logical map may store tuples of <LBA, PBA>, where the LBA is the key and the PBA is the value. As used herein, a key is an identifier of data and a value is either the data itself or a pointer to a location (e.g., on disk) of the data associated with the identifier. In some embodiments, the logical map further includes a number of corresponding data blocks stored at a physical address that starts from the PBA (e.g., tuples of <LBA, PBA, number of blocks>, where LBA is the key). In some embodiments where the data blocks are compressed, the logical map further includes the size of each data block compressed in sectors and a compression size (e.g., tuples of <LBA, PBA, number of blocks, number of sectors, compression size>, where LBA is the key).

In certain other embodiments, for each LBA, VSAN module 108, may store in a logical map, at least a corresponding MBA, which further maps to a PBA in a middle map of extent map 142. In other words, extent map 142 may be a two-layer mapping architecture. A first map in the mapping architecture, e.g., the logical map, may include an LBA to MBA mapping table, while a second map, e.g., the middle map, may include an MBA to PBA mapping table. For example, the logical map may store tuples of <LBA, MBA>, where the LBA is the key and the MBA is the value, while the middle map may store tuples of <MBA, PBA>, where the MBA is the key and the PBA is the value. According to the information stored in the logical map, VSAN module 108 may use the logical map to determine which PBA is referenced by an LBA.

Logical maps may also be used in snapshot mapping architecture. Modern storage platforms, including VSAN 116, may enable snapshot features for backup, archival, or data protections purposes. Snapshots provide the ability to capture a point-in-time state and data of a VM 105 to not only allow data to be recovered in the event of failure but restored to known working points. Snapshots may capture VMs' 105 storage, memory, and other devices, such as virtual network interface cards (NICs), at a given point in time. Snapshots do not require an initial copy, as they are not stored as physical copies of data blocks (at least initially), but rather as pointers to the data blocks that existed when the snapshot was created. Because of this physical relationship, a snapshot may be maintained on the same storage array as the original data.

As mentioned, snapshots collected over two or more backup sessions may create a snapshot hierarchy where snapshots are connected in a branch tree structure with one or more branches. Snapshots in the hierarchy have parent-child relationships with one or more other snapshots in the hierarchy. In linear processes, each snapshot has one parent snapshot and one child snapshot, except for the last snapshot, which has no child snapshots. Each parent snapshot may have more than one child snapshot. Additional snapshots in the snapshot hierarchy may be created by reverting to the current parent snapshot or to any parent or child snapshot in the snapshot tree to create more snapshots from that snapshot. Each time a snapshot is created by reverting to any parent or child snapshot in the snapshot tree, a new branch in the branch tree structure is created.

Figure 2:
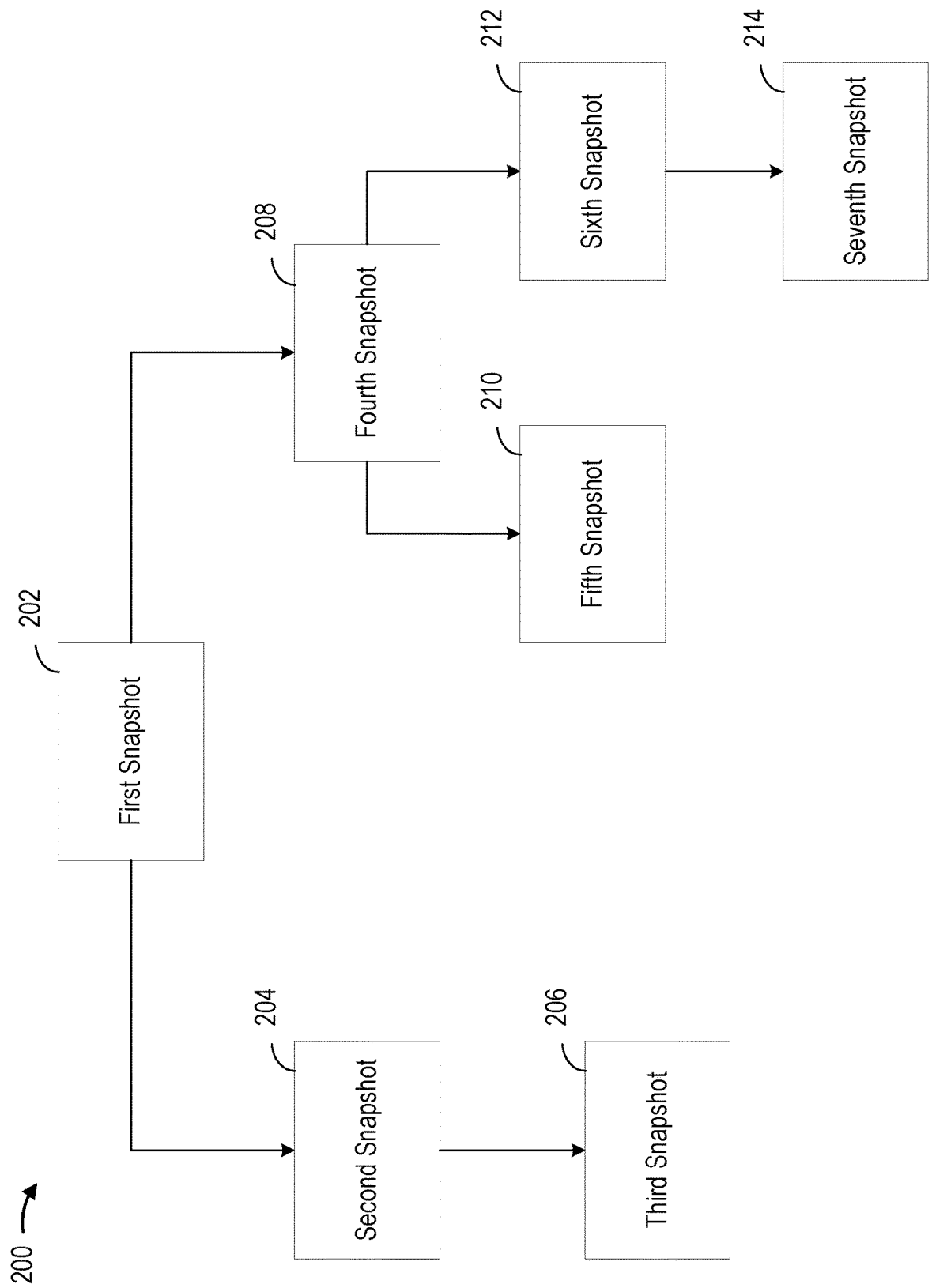
FIG. 2 is a block diagram illustrating an example snapshot hierarchy, according to an example embodiment of the present disclosure.

FIG. 2 is a block diagram illustrating an example snapshot hierarchy 200, according to an example embodiment of the present disclosure. As shown in FIG. 2, seven snapshots may exist in snapshot hierarchy 200. A first snapshot 202 may be a snapshot created first in time. First snapshot 202 may be referred to as a root snapshot of the snapshot hierarchy 200, as first snapshot 202 does not have any parent snapshots. First snapshot 202 may further have two child snapshots: second snapshot 204 and fourth snapshot 208. Fourth snapshot 208 may have been created after reverting back to first snapshot 202 in snapshot hierarchy 200, thereby creating an additional branch from first snapshot 202 to fourth snapshot 208. Second snapshot 204 and fourth snapshot 208 may be considered sibling snapshots. Second snapshot 204 and fourth snapshot 208 are only child snapshots of first snapshot 202 but also parent snapshots of other snapshots in snapshot hierarchy 200. In particular, second snapshot 204 is a parent of third snapshot 206, and fourth snapshot 208 is a parent of both fifth snapshot 210 and sixth snapshot 212. Third snapshot 206, fifth snapshot 210, and sixth snapshot 212 may be considered grandchildren snapshots of first snapshot 202. Third snapshot 206 and fifth snapshot 210 may not have any children snapshots; however, sixth snapshot 212 has a child snapshot, seventh snapshot 214. Seventh snapshot 214 may not have any children snapshots in snapshot hierarchy 200.

While FIG. 2 illustrates only seven snapshots in snapshot hierarchy 200, any number of snapshots may be considered as part of a snapshot hierarchy. Further, any parent-child relationships between the snapshots in the snapshot hierarchy may exist in addition to, or alternative to, the parent-child relationships illustrated in FIG. 2.

Figure 3:
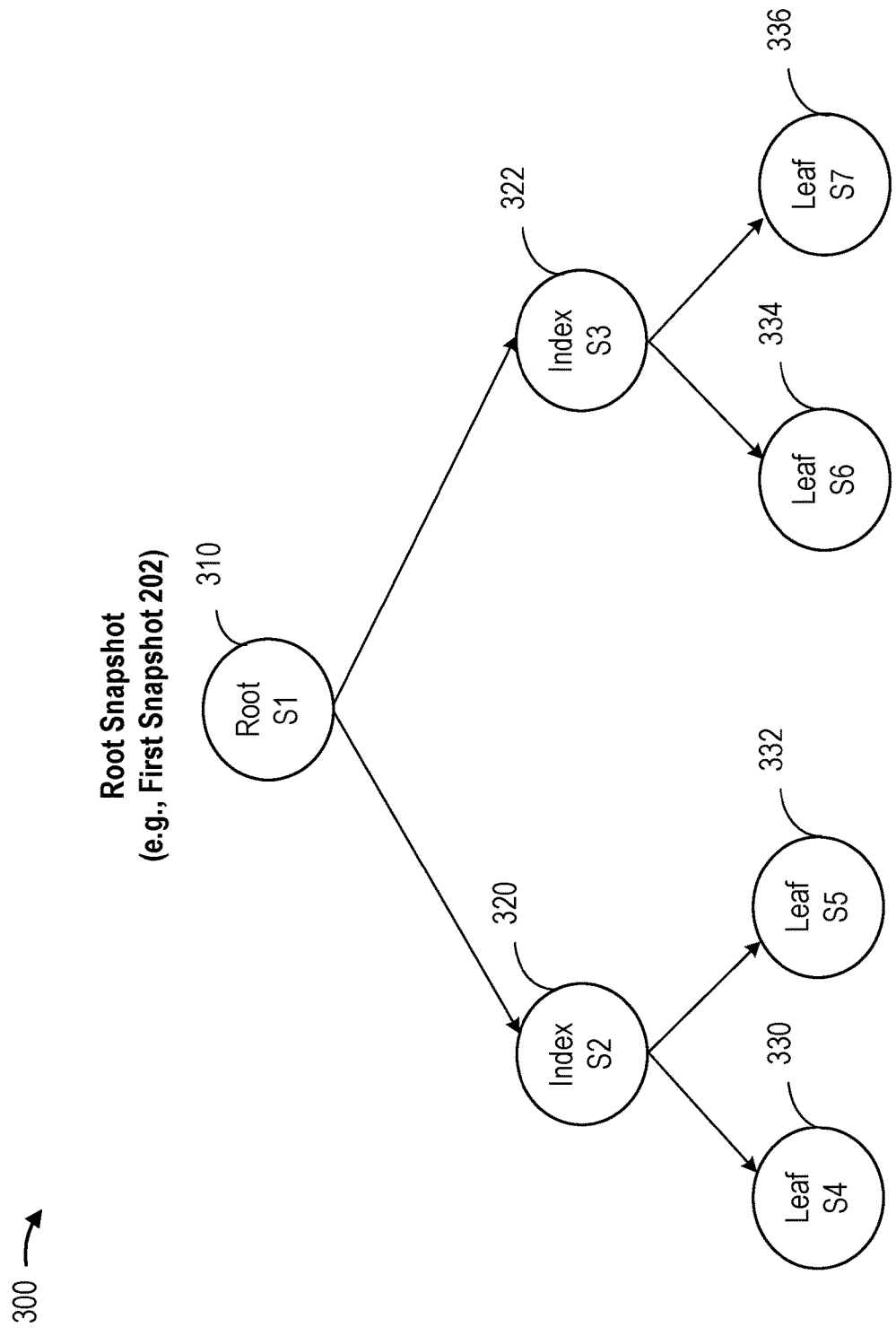
FIG. 3 is a block diagram illustrating a B+ tree data structure, according to an example embodiment of the present disclosure.

Each snapshot in the snapshot hierarchy may include its own logical map. In certain embodiments, the logical maps of the snapshots are stored as a B+ tree. FIG. 3 is a block diagram illustrating a B+ tree 300 data structure, according to an example embodiment of the present application. For illustrative purposes, B+ tree 300 may represent the logical map for the root snapshot (e.g., first snapshot 202) in snapshot hierarchy 200.

As illustrated, B+ tree 300 may include a plurality of nodes connected in a branching tree structure. The top node of a B+ tree may be referred as a root node, e.g., root node 310, which has no parent node. The middle level of B+ tree 300 may include index nodes 320 and 322 (also referred to as "index" nodes), which may have both a parent node and one or more child nodes. In the illustrated example, B+ tree 300 has three levels (e.g., level 0, level 1, and level 2), and only a single middle level (e.g., level 1), but other B+ trees may have a greater number of levels with more middle levels and thus greater heights. The bottom level of B+ tree 300 may include leaf nodes 330-336 which do not have any more children nodes. In the illustrated example, in total, B+ tree 300 has seven nodes and three levels. Root node 310 is in level two of the tree, middle (or index) nodes 320 and 322 are in level one of the tree, and leaf nodes 330-336 are in level zero of the tree.

Each node of B+ tree 300 may store at least one tuple. In a B+ tree, leaf nodes may contain data values (or real data) and middle (or index) nodes may contain only indexing keys. For example, each of leaf nodes 330-336 may store at least one tuple that includes a key mapped to real data, or mapped to a pointer to real data, for example, stored in a memory or disk. As shown in FIG. 3, these tuples may correspond to key-value pairs of <LBA, MBA> or <LBA, PBA> mappings for data blocks associated with each LBA. In some embodiments, each leaf node may also include a pointer to its sibling(s), which is not shown for simplicity of description. On the other hand, a tuple in the middle and/or root nodes of B+ tree 300 may store an indexing key and one or more pointers to its child node(s), which can be used to locate a given tuple that is stored in a child node.

Because B+ tree 300 contains sorted tuples, a read operation such as a scan or a query to B+ tree 300 may be completed by traversing the B+ tree relatively quickly to read the desired tuple, or the desired range of tuples, based on the corresponding key or starting key.

According to aspects described herein, each node of B+ tree 300 may be assigned a monotonically increasing sequence number (SN). For example, a node with a higher SN may be a node which was created later in time than a node with a smaller SN. As shown in FIG. 3, root node 310 may be assigned an SN of S1 as root node 310 belongs to the root snapshot (e.g., first snapshot 202 illustrated in FIG. 2, created first in time) and was the first node created for the root snapshot. Other nodes of B+ tree 300 may similarly be assigned an SN, for example, node 320 may be assigned S2, index node 322 may be assigned S3, leaf node 330 may be assigned S4, and so forth. As described in more detail below, the SNs assigned to each node in the B+ tree snapshot may be used during snapshot deletion to verify nodes that are exclusively owned by the snapshot or that are shared with a parent snapshot.

In certain embodiments, the B+ tree logical map for each child snapshot in a snapshot hierarchy may be a COW B+ tree (also referred to as an append-only B+ tree). When a COW approach is taken and a child snapshot is created, instead of copying the entire B+ tree logical map of the parent snapshot, the child snapshot shares with the parent and, in some cases, ancestor snapshots, one or more extents by having a B+ tree index node, exclusively owned by the child, point to shared parent and/or ancestor B+ tree nodes.

This COW approach for the creation of a child B+ tree logical map may be referred to as a "lazy copy approach" as the entire B+ tree logical map of the parent snapshot is not copied when creating the child B+ tree logical map.

Figure 4:
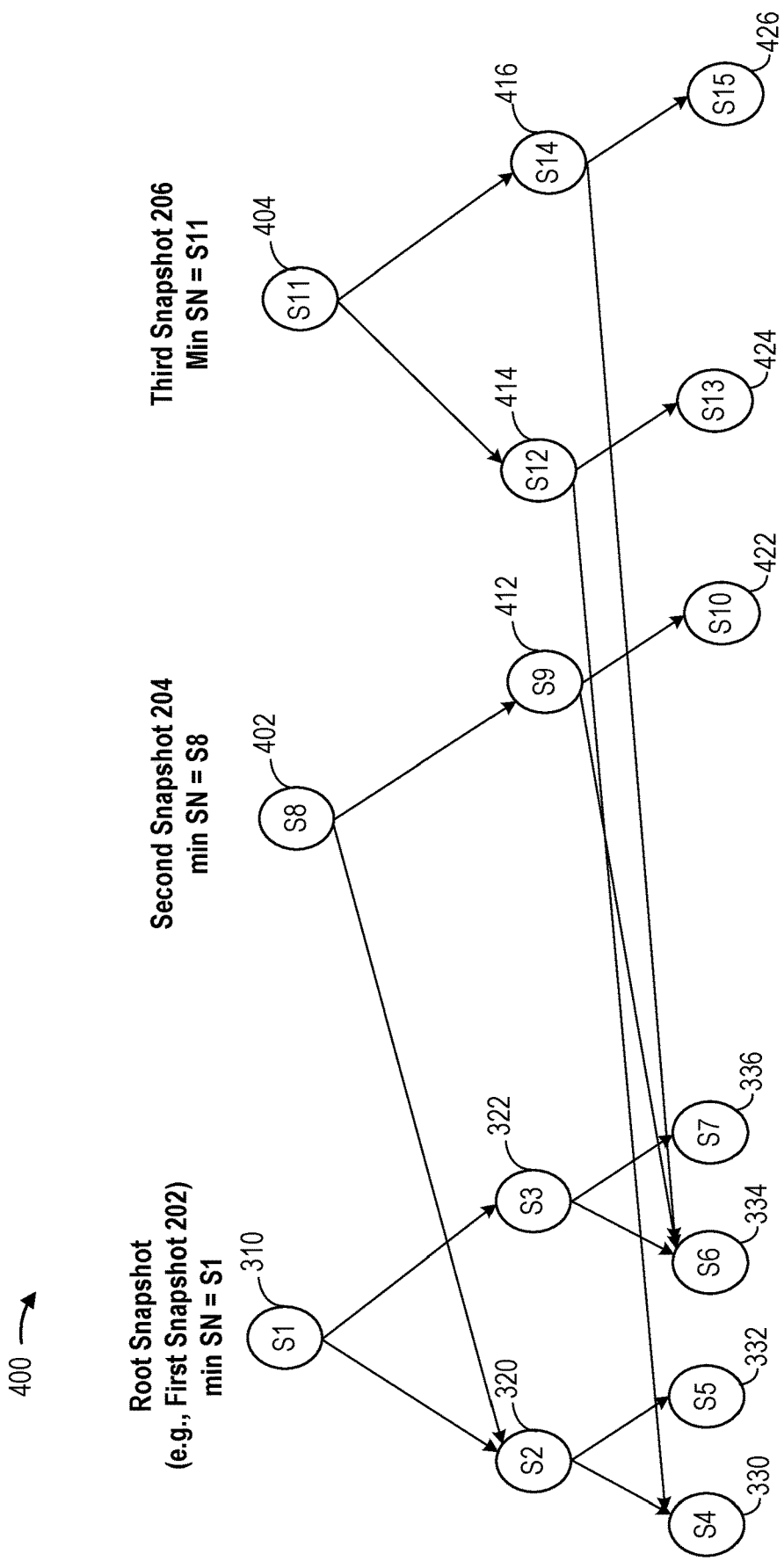
FIG. 4 is a block diagram illustrating a B+ tree data structure using a copy-on-write (COW) approach for the creation of logical map B+ trees for child snapshots in a snapshot hierarchy, according to an example embodiment of the present application

FIG. 4 is a block diagram illustrating a B+ tree data structure 400 using a COW approach for the creation of B+ tree logical maps for child snapshots in a snapshot hierarchy, according to an example embodiment of the present application. For illustrative purposes, B+ tree data structure 400 may represent the B+ tree logical maps for first snapshot 202, second snapshot 204, and third snapshot 206 in snapshot hierarchy 200. Fourth snapshot 208, fifth snapshot 210, sixth snapshot 212, and seventh snapshot 214 have been removed from the illustration of FIG. 4 for simplicity. However, B+ tree logical maps for fourth snapshot 208, fifth snapshot 210, sixth snapshot 212, and seventh snapshot 214 may exist in a similar manner as B+ tree logical maps described for first snapshot 202, second snapshot 204, and third snapshot 206 in FIG. 4.

As shown in FIG. 4, index node 320 and leaf node 334 are shared by root node 310 of a first B+ tree logical map (e.g., associated with first snapshot 202) and root node 402 of a second B+ tree logical map (e.g., associated with second snapshot 204, which is a child snapshot of first snapshot 202) generated from the first B+ tree logical map. This way, the two root nodes 310 and 402 may share the data of the tree without having to duplicate the entire data of the tree.

More specifically, when the B+ tree logical map for second snapshot 204 was created, the B+ tree logical map for first snapshot 202 was copied and snapshot data for leaf node 336 was overwritten, while leaf nodes 330, 332, and 334 were unchanged. Accordingly, root node 402 in the B+ tree logical map for second snapshot 204 has a pointer to node 320 in the B+ tree logical map for first snapshot 202 for the shared nodes 320, 330, and 332, but, instead of root node 402 having a pointer to index node 322, index node 412 was created with a pointer to shared leaf node 334 (e.g., shared between first snapshot 202 and second snapshot 204) and a pointer to new leaf node 422, containing metadata for the overwritten data block. Similar methods may be used to create the B+ tree logical map for third snapshot 206 illustrated in FIG. 4.

As mentioned, each node of each B+ tree logical map in B+ tree data structure 400 may be assigned a monotonically increasing SN for purposes of checking the metadata consistency of snapshots in B+ tree data structure 400, and more specifically, in snapshot hierarchy 200. Further, the B+ tree logical map for each snapshot in B+ tree data structure 400 may be assigned a min SN, where the min SN is equal to a smallest SN value among all nodes owned by the snapshot. For example, in the example B+ tree data structure 400, first snapshot 202 may own nodes S1-S7; thus, the min SN assigned to the B+ tree logical map of first snapshot 202 may be equal to S1. Similarly, second snapshot 204 may own nodes S8-S10; thus, the min SN of the B+ tree logical map of second snapshot 204 may be equal to S8, and third snapshot 206 may own node S11-S15; thus, the min SN of the B+ tree logical map of third snapshot 206 may be equal to S11.

Accordingly, each node in the B+ tree logical map of child snapshots 204 and 206 whose SN is smaller than the min SN assigned to the B+ tree logical map of the snapshot may be a node that is not owned by the snapshot, but instead shared with an ancestor snapshot. For example, when traversing through the B+ tree logical map of second snapshot 204, node 320 may be reached. Because node 320 is associated with an SN less than the min SN of second snapshot 204 (e.g., S2<S8), node 320 may be determined to be a node that is not owned by second snapshot 204, but instead owned by first snapshot 202 and shared with second snapshot 204. On the other hand, each node in the B+ tree logical maps of child snapshots 204 and 206 whose SN is larger than the min SN assigned to the snapshot may be a node that is owned by the snapshot. For example, when traversing through the B+ tree logical map of second snapshot 204, node 412 may be reached. Because node 412 is associated with an SN greater than the min SN of second snapshot 204 (e.g., S9>S8), node 412 may be determined to be a node that is owned by second snapshot 204. Such rules may be true for all nodes belonging to each of the snapshot B+ tree logical maps created for a snapshot hierarchy, such as snapshot hierarchy 200 illustrated in FIG. 2.

Figure 5:
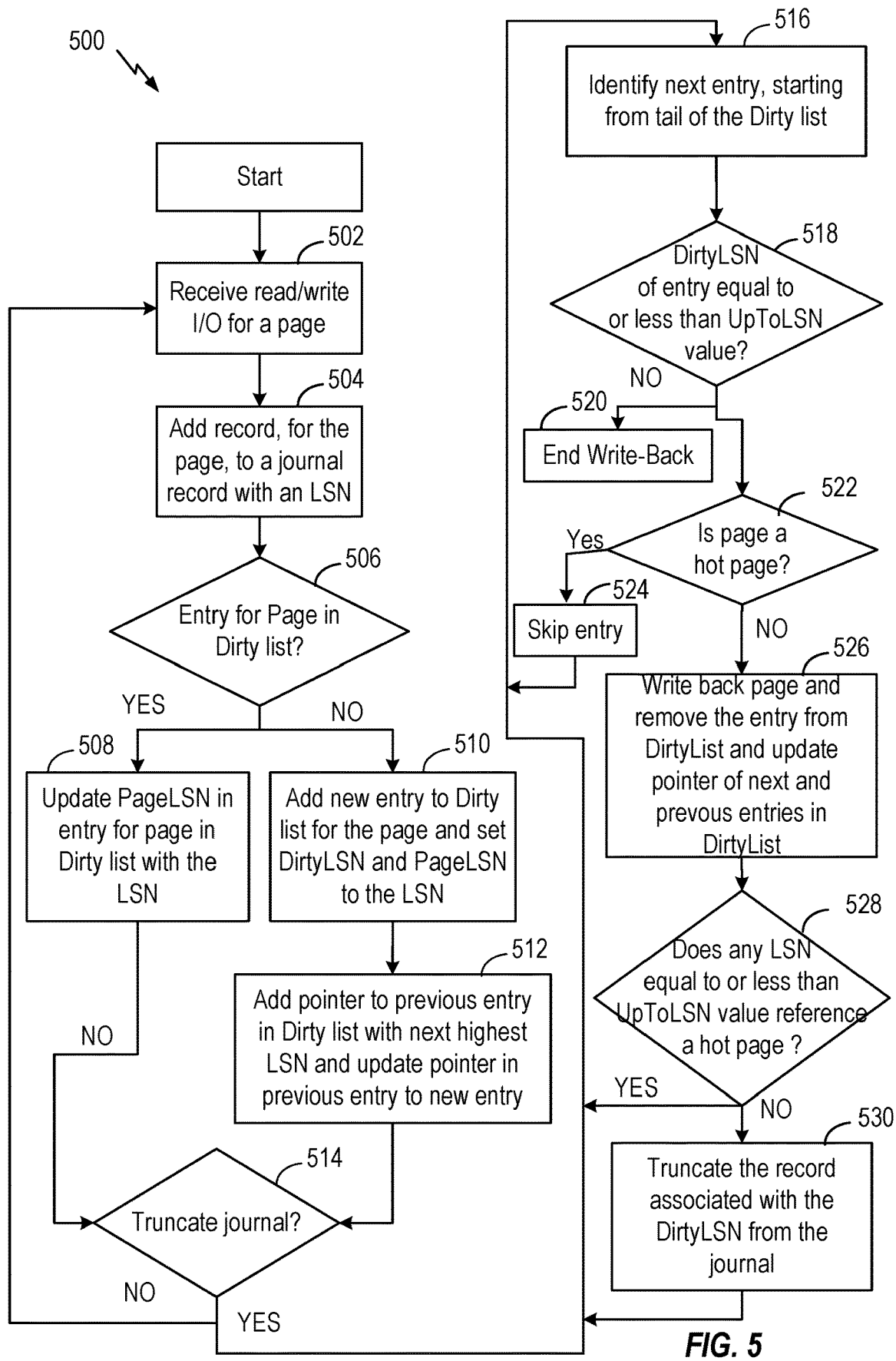
FIG. 5 is an example workflow for efficient write-back for journal truncation, according to an example embodiment of the present disclosure.

FIG. 5 is an example workflow 500 for efficient write back for journal truncation, according to an example embodiment of the present disclosure. Workflow 500 may be performed by VSAN module 108, and in some cases, zDOM sub-module 132, illustrated in FIG. 1. Operations of workflow 500 may be described with respect to example snapshot hierarchy 200 of FIG. 2 and B+ tree 300 illustrated in FIG. 3 and with respect to the journal and dirty list 158 of FIGS. 6-12.

Workflow 500 may begin, at operation 502, by VSAN module 108 by receiving a read or write I/O. In some embodiments, a number of I/Os are buffered before being committed and flushed. The I/Os may be associated with transactions to a data structure, such as a COW B+ tree. Each transaction may be assigned a monotonically increasing LSN. As discussed above, a batch of LSNs that are committed may be associated with a FlushedLSN that is the largest LSN of the batch.

At operation 504, one or more records are added to the journal, each record associated with a respective LSN. For example, the one or more records may be added to the journal for one or more LSNs flushed from a buffer. As discussed herein, the journal may be a WAL for a COW B+ tree or other transaction log that records changes to a data structure. The description of FIG. 5 continues below, with reference to FIGS. 6-12. As shown in the illustrative example in FIG. 6, the journal 605 contains a header and records 610-630, where each of the records 610-630 references one or more pages (shown in the FIG. 6 as page "A", page "B", and page "C") and an LSN.

Figure 6:
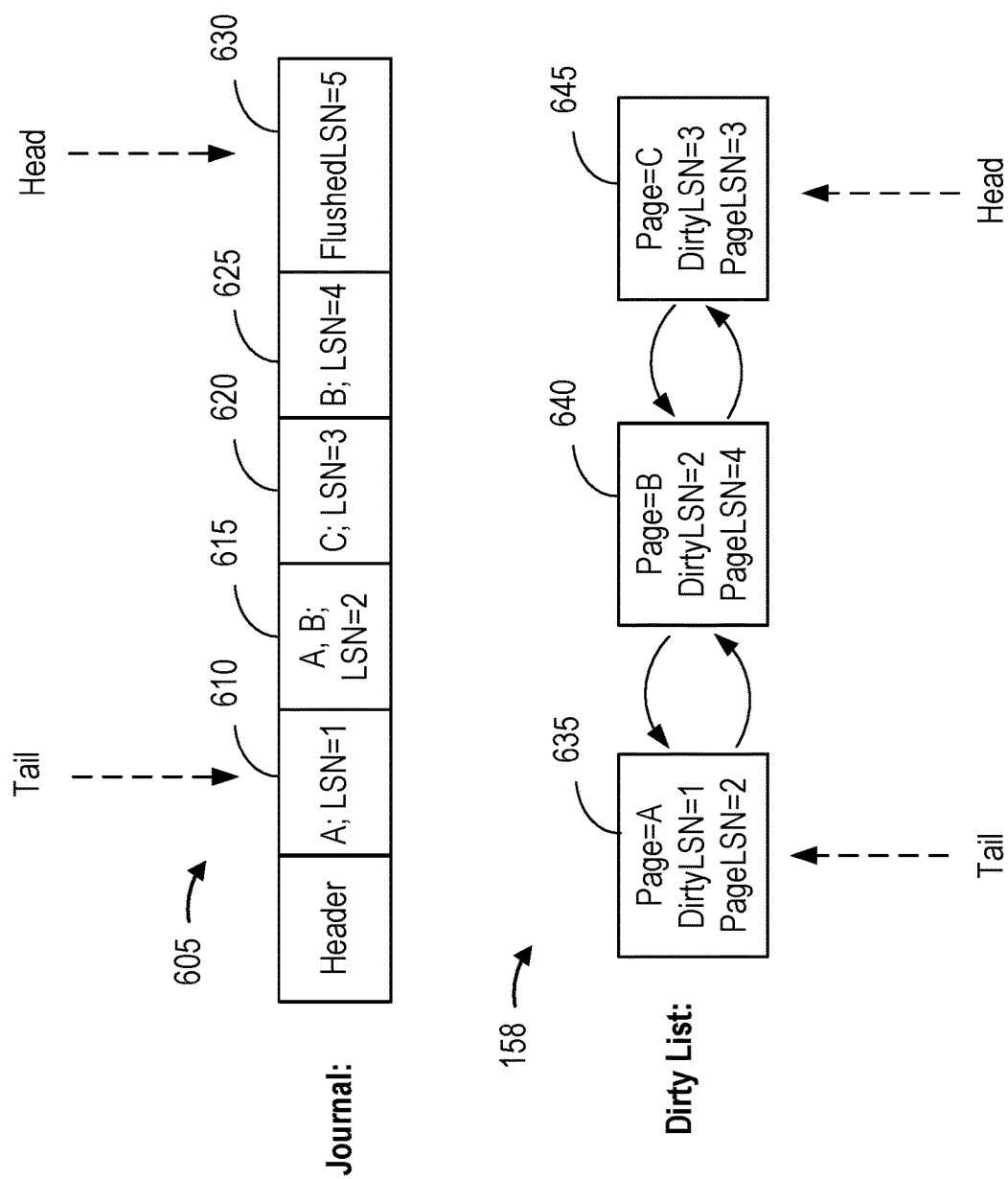
FIG. 6 is an example journal and dirty list, according to an example embodiment of the present disclosure.

As discussed above, in some embodiments, the system maintains a dirty list 158. The dirty list 158 may include an entry for each page referenced in the journal, along with a dirty LSN value that is the LSN of the first (e.g., the lowest LSN) record that references that page and a PageLSN value that is the LSN of the last (e.g., the largest LSN) record that references that page. In addition, as discussed above, in some embodiments, dirty list 158 is a linked list in which each entry is associated with pointers (e.g., metadata) to the next entry in the dirty list 158 (e.g., next being the entry with the next larger LSN value) and the previous entry in the dirty list 158 (e.g., previous being the entry with the next smaller LSN value), and where the dirty list 158 has a head (e.g., the entry associated with the largest LSN) and a tail (e.g., the entry associated with the smallest LSN). As shown in FIG. 6, dirty list 158 includes entry 635 referencing page A, with the DirtyLSN=1 where the record 610 with the LSN=1 is the first record in journal 605 that references the page A, and with the PageLSN=2 where the record 615 is the last record in journal 605 that references the page A. As shown, the dirty list 158 includes similar entry 640 for the page B and entry 645 for the page C.

When a record is added to the journal, one or more entries in the dirty list 158 are created or updated. Accordingly, at operation 506, the system checks whether there is any entry in the dirty list 158 associated with a page referenced by the record being added to the journal 605.

Where the system determines, at operation 506, the page is not already included in any entry in the dirty list 158, then at operation 510 a new entry is created in the dirty list 158 for that page and the DirtyLSN and Page LSN values are set to the respective LSN of the record being added to the journal. For example, when the record 610 is added to the journal 605, the entry 635 is added to dirty list 158 with the DirtyLSN=1, as shown in FIG. 6, and the PageLSN=1 (not shown). In addition, at operation 512, pointers are added to the new entry to point to the previous entry and the next entry in the dirty list 158.

Where the system determines, at operation 506, the page is already included in an entry in the dirty list 158, then at operation 508 the system updates the PageLSN of that entry to the LSN in the record being added to the journal. For example, when the record 615 is added to the journal 605, the PageLSN of entry 635 is updated to PageLSN=2 because record 615, with the LSN=2, references the page A, as shown in FIG. 6. In addition, a new entry 640 is created for the page B with the DirtyLSN=2 and the PageLSN=2 (not shown). Further, entry 640 includes a pointer to previous entry 635 and a pointer is added to entry 635 to point to next entry 640.

Returning to FIG. 5, at operation 514, the system determines whether to perform journal truncation. In some embodiments, the system determines whether the size of the journal 605 has reached a threshold size and, if so, that the journal 605 needs to be truncated or, if not, that the journal 605 does not need to be truncated. The threshold size for the journal may be the total size of the journal or a configured portion of the journal size. In some embodiments, in addition or alternatively to determining the journal 605 has reached a threshold size, at operation 514, the system may determine periodically to truncate the journal 605. In this case, the system may determine whether a threshold time has passed, where the threshold time is the period for journal truncation. In some embodiments, in addition or alternatively to determining the journal 605 has reached a threshold size and/or to determining a threshold time has passed, the system may determine, at operation 514, to truncate the journal 605 based on occurrence of some other event or trigger configured for journal truncation.

Where the system determines, at operation 514, not to truncate the journal 605 the system may return to operation 502 and repeat operations 502-514 until journal truncation is needed.

Where the system determines, at operation 514, to truncate the journal 605, then at operation 516 the system identifies a next entry, starting from the tail of the dirty list 158. Next entries may identify using the pointers. In the example illustrated in FIG. 6, the system may first identify entry 635 which is at the tail of dirty list 158.

At operation 518, the system determines whether the DirtyLSN value of the identified entry is equal to less than an UpToLSN value. The system will not truncate any records from the journal 605 with an LSN that is larger than the UpToLSN value. In some embodiments, the UpToLSN value is determined by the system using the incremental truncation queue 148.

Figure 13:
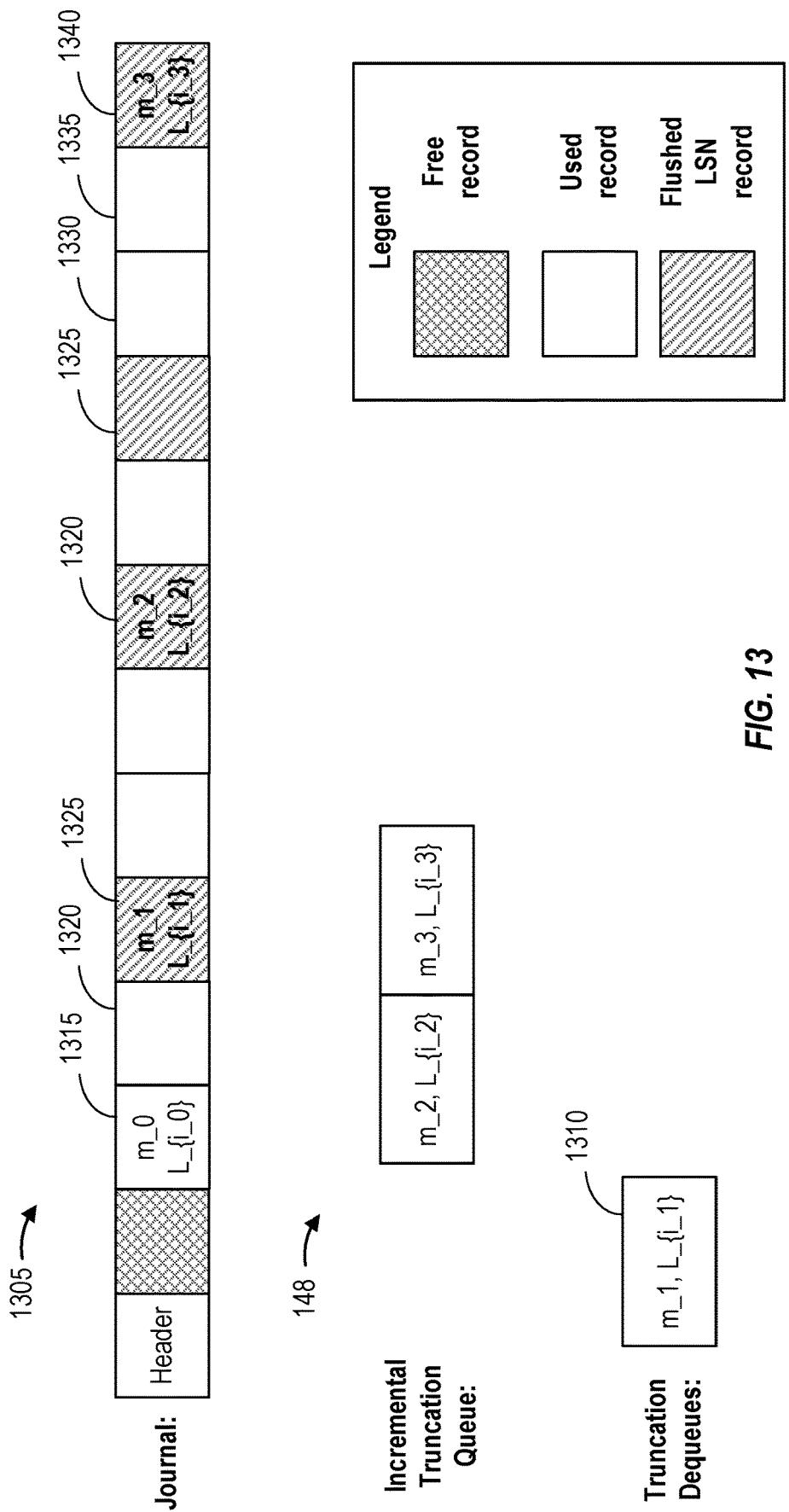
FIG. 13 is an example incremental truncation queue, according to an example embodiment of the present disclosure.

As shown in FIG. 13, the system may maintain an incremental truncation queue 148. Each entry in the incremental truncation queue 148 may include a physical offset, mi, and an LSN, Li, of a record in a journal 1305. The physical offset and LSN of a record in journal 1305 may be added to the incremental truncation queue 148 when the physical offset of that record from a most recent record added to the incremental truncation queue 148 is larger than a threshold. That is, each entry in incremental truncation queue 148 is associated with a portion of the journal 1305, with the physical offset and LSN in the entry being the physical offset and LSN of the record at the end of that portion. Accordingly, when journal truncation occurs, the system may truncate a portion of the journal 1305 associated with the least recent entry of the incremental truncation queue 148, and then the entry is removed from the incremental truncation queue 148. As shown in FIG. 13, the incremental truncation queue 148 includes the entry 1310 with the physical offset mi and the LSN of record 1325, where record 1325 is a FlushedLSN and is the largest LSN of the portion of the journal 1305 including records 1315, 1320, and 1325.

Accordingly, when the system determines, at operation 514, to truncate the journal, the UpToLSN value may be the LSN in the least recent entry of the incremental truncation queue 148. As shown in FIG. 13, the least recent entry 1310 is dequeued for journal truncation and, in this case, the UpToLSN value is Li 1.

Figure 7:
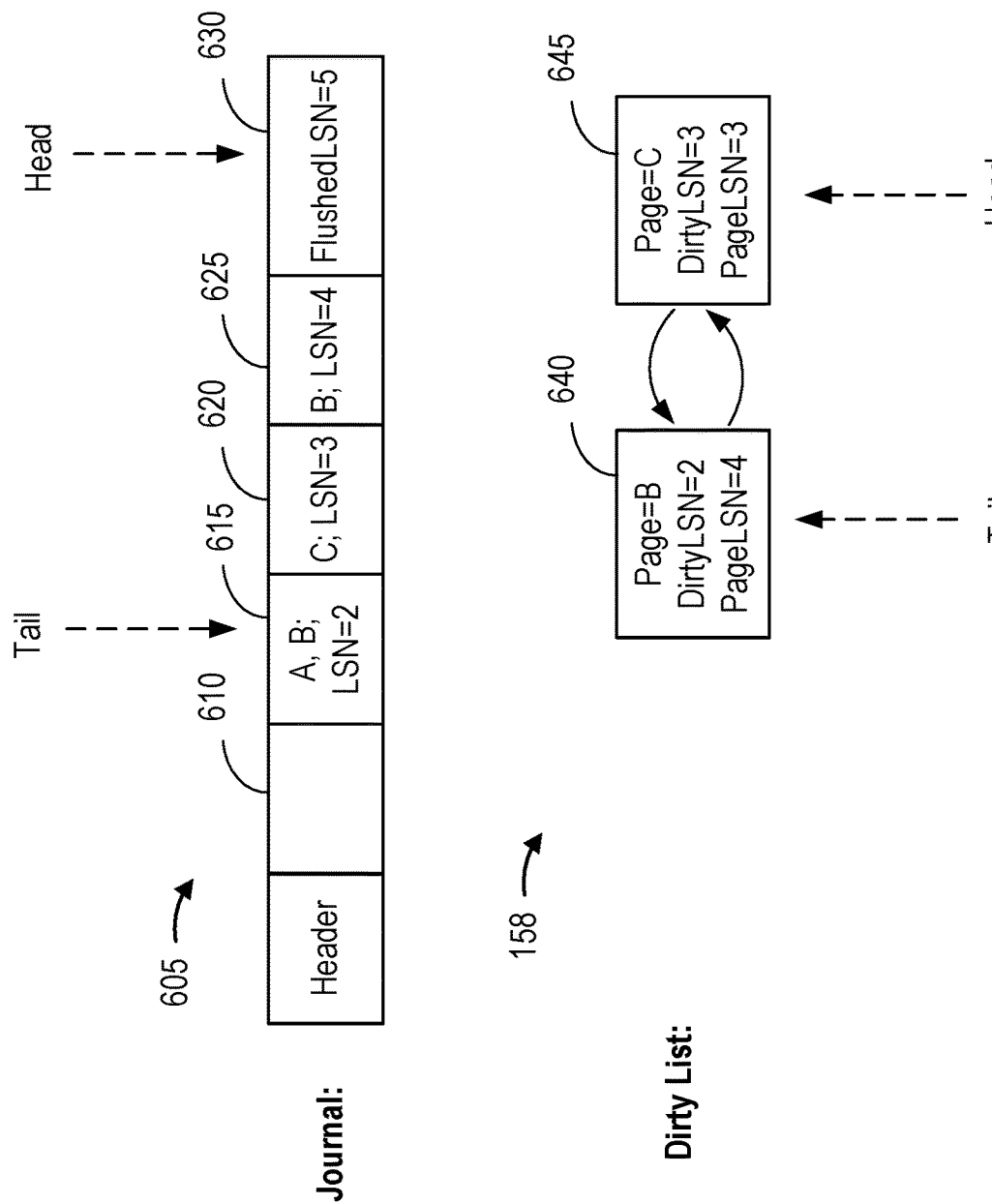
FIG. 7 is an example of writing back records from the journal using the dirty list and updating the dirty log sequence number (LSN) list of FIG. 6, according to an example embodiment of the present disclosure.

Returning to FIG. 5, where the system determines, at operation 518, that the DirtyLSN of the identified entry in the dirty list 158 is larger than the UpToLSN, the system does write back the respective page to the disk. That is, the system does not persist the effect of the transaction associated with the page that is referenced by the respective record in the journal record with the DirtyLSN value, for example, because the record will not be truncated. At this point, the system ends write back at operation 520. That is, the system may not continue to check the remainder of the dirty list 158 given that the remainder of entries in the dirty list 158 will also not be truncated (e.g., will all have a DirtyLSN that is larger than the UpToLSN).

Where the system determines, at operation 518, that the DirtyLSN value of the identified entry in the dirty list 158 is equal to or less than an UpToLSN value, then at operation 522, the system determines whether the page referenced by the identified entry is a hot page. A hot page may be page that is referenced by a most recent record in the journal.

Where the system determines, at operation 522, that the page referenced by the identified entry is not a hot page, then at operation 526, the page is written back to the disk and the entry is removed from the dirty list 158. In addition, the pointers of the next and previous entries in the dirty list 158 are updated to reflect the removal of the entry, that is, the pointers of the next and previous are updated to point to each other. As shown in FIG. 7, the entry 635 is removed from dirty list 158. In addition, the entry 640 is updated to remove the pointer to entry 635 and entry 640 becomes the tail of dirty list 158.

At operation 528, the system determines whether any SLN equal to or less than the UpToLSN value reference a hot page. Where the system determines, at operation 528, that there is not a hot page referenced by any SLN equal to or less than the UpToLSN value then, at operation 530, the system truncates the record associated with the DirtyLSN of the entry from the journal. As shown in FIG. 6, the pages A, B, and C are not hot pages. Accordingly, as shown in FIG. 7, the respective record 610 associated with the DirtyLSN=1 of the entry 635 is truncated from the journal 605.

Figure 8:
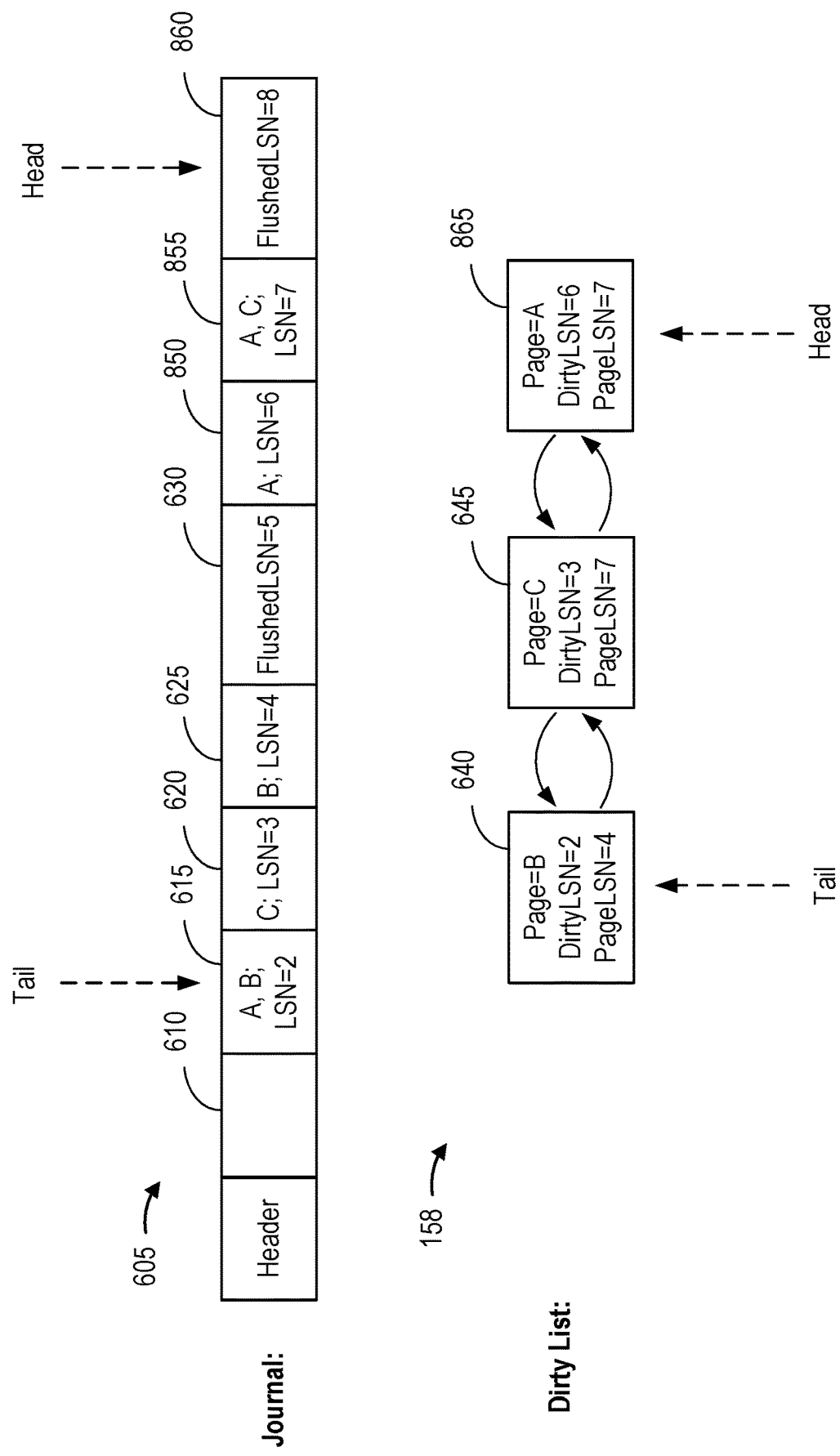
FIG. 8 is an example of adding records to the journal and updating the dirty list of FIG. 7, according to an example embodiment of the present disclosure.
Figure 9:
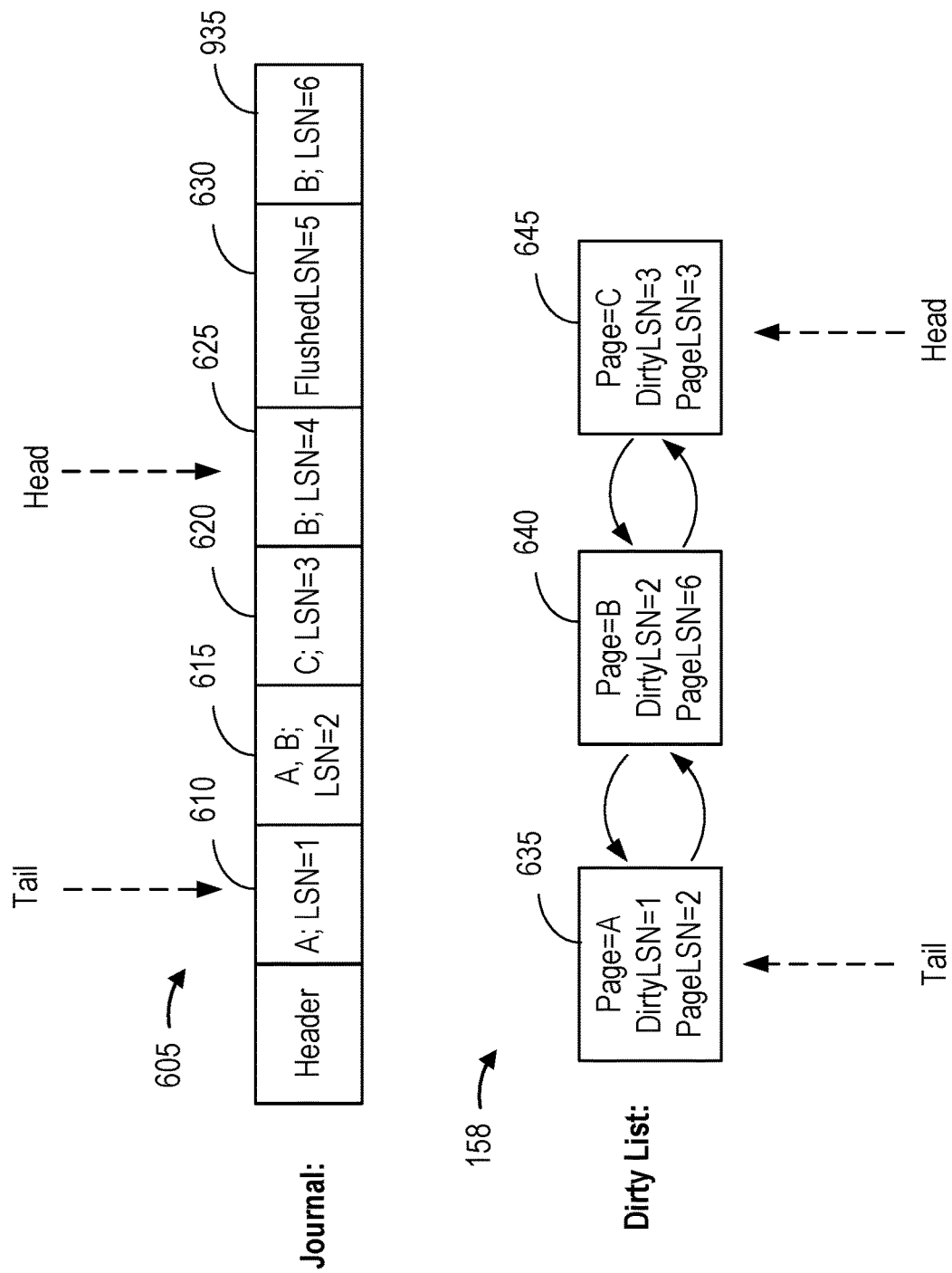
FIG. 9 is another example of adding records to the journal and updating the dirty list of FIG. 6, according to an example embodiment of the present disclosure.
Figure 10:
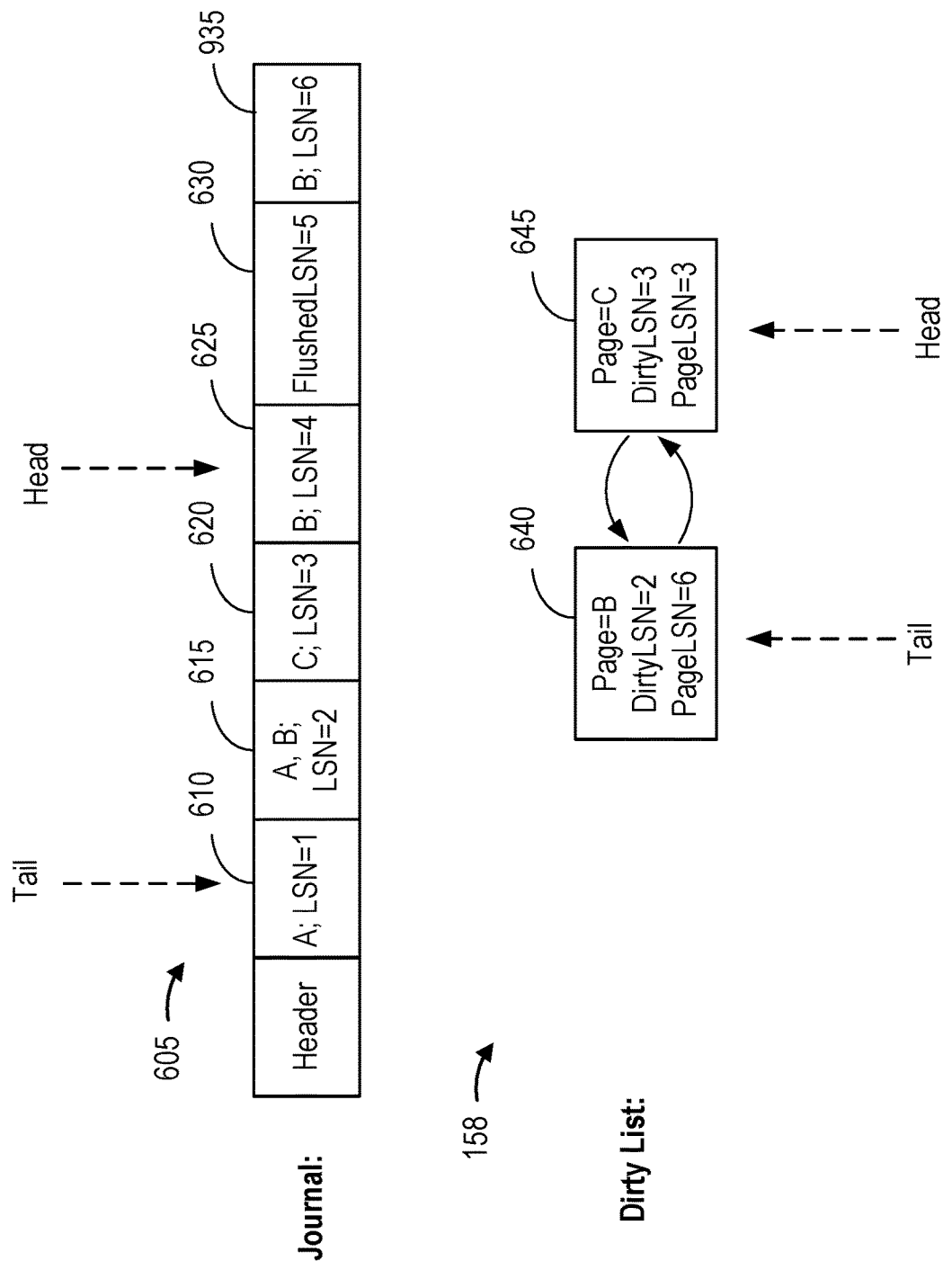
FIG. 10 is an example of writing back records from the journal and updating the dirty list of FIG. 9, according to an example embodiment of the present disclosure.

FIG. 8 illustrates additional records 850, 855, and 860 added to the journal 605 of FIG. 7. The record 855 references the page C. Accordingly, the entry 645 for the page C is updated with the PageLSN=7 of record 855 as shown in FIG. 8. Further, the records 850 and 855 reference the page A. Accordingly, a new entry 865 is added in the dirty list 158 for the page A with DirtyLSN=6 of the record 850 and PageLSN=7 of the record 855 as shown in FIG. 8. A pointer for entry 865 may point to previous entry 645 and the entry 645 may be updated to point to entry 865, which becomes the head of the dirty list 158.

Where the system determines, at operation 528, that there is a hot page then the system does not truncate the respective record associated with the DirtyLSN of the entry from the journal. As shown in FIG. 9, the record 935 is added to the journal 605 of FIG. 6 and references the page B and is a hot page. Accordingly, the system removes the entry 635 but does not truncate the record 610 because there is the hot page B, as shown in FIG. 10.

Figure 11:
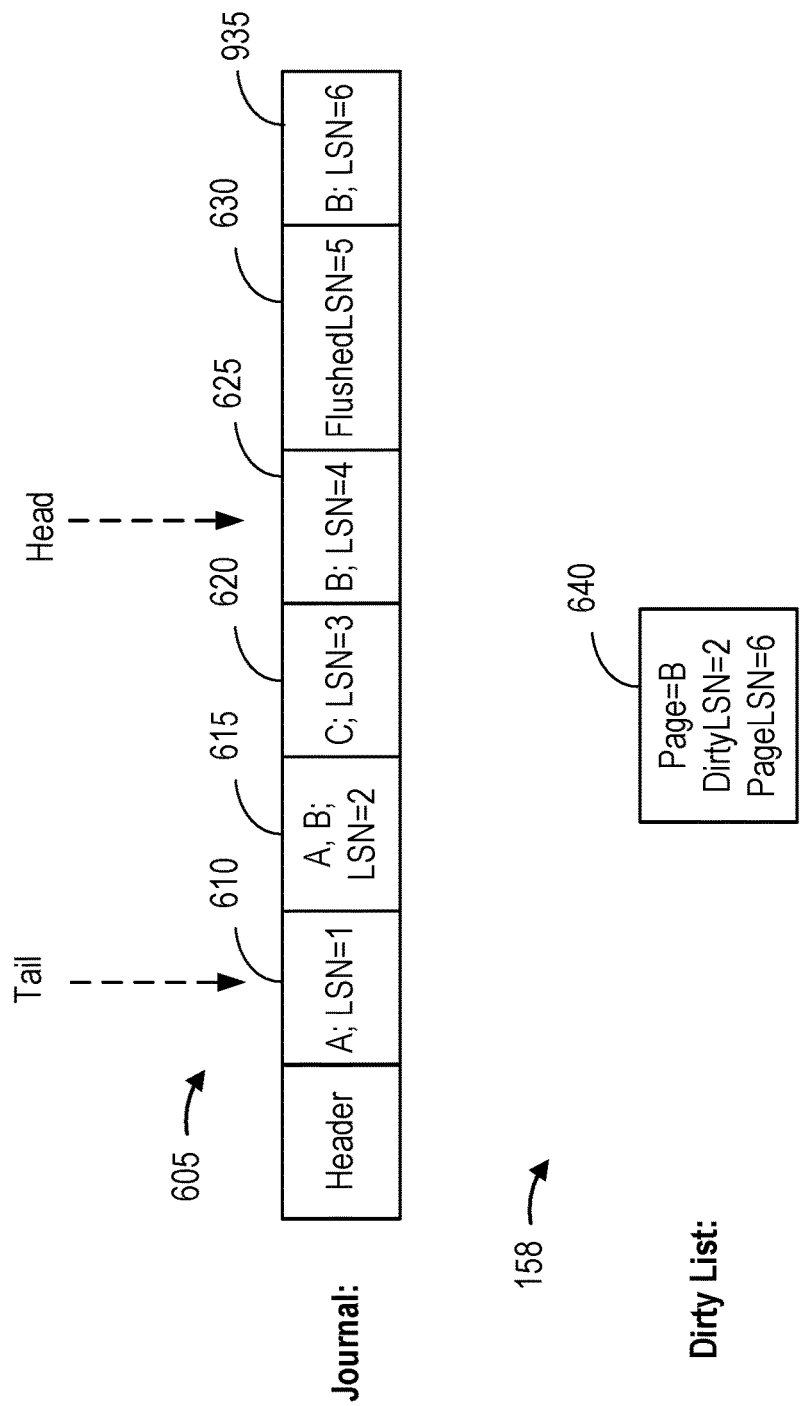
FIG. 11 is an example of writing back records from the journal and updating the dirty list of FIG. 10, according to an example embodiment of the present disclosure.

Returning to FIG. 5, the system then returns to operation 516 and repeats the operations 516-530 until the system determines, at operation 518, that the UpToLSN value is exceeded.

Where the system determines, at operation 522, that the entry references a page that is a hot page then, at operation 524, the system skips the entry. The system then returns to operation 516. As shown in FIG. 10, the system skips the entry 640 referencing the hot page B. As shown in FIG. 11, the system then removes the entry 645 for page C, but does not truncate the record 620.

Figure 12:
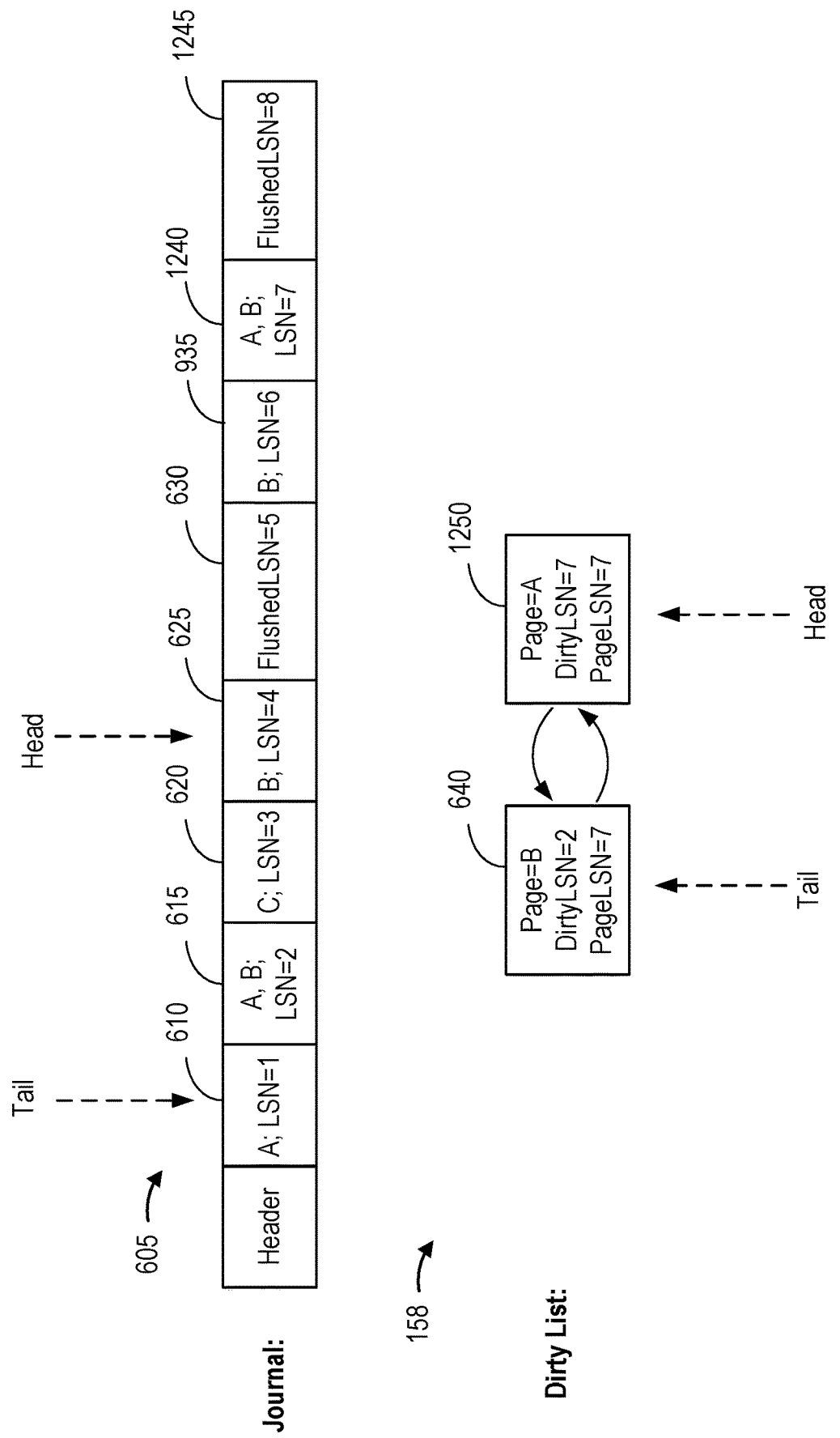
FIG. 12 is an example of adding records to the journal and updating the dirty list of FIG. 11, according to an example embodiment of the present disclosure.

FIG. 12 illustrates records 1240 and 1245 added to the journal 605 of FIG. 11. The record 1240 references the page A and B. Accordingly, as shown in FIG. 12, the entry 640 is updated with the PageLSN=7 of record 1240 and new entry 1250 is added to the dirty list 158 with the DirtyLSN=7 and the PageLSN=7. In addition, a pointer in entry 1250 points to previous entry 640 and entry 640 is updated to point to next entry 1250.

In some embodiments, when a page is written back to the disk, the page is locked. In some embodiments, after a page is written back, and the page can be truncated, at operation 530, the page is not immediately truncated from the journal 605. Instead, the system waits until multiple pages can be truncated to reduce the number of I/Os for the truncation. Once the page is written back, the system can update the new tail to free up space and remove the entry from the dirty list 158.

In some embodiments, during the write back and truncation, the system keeps generating new log records, however, dirtied entries are only appended to the dirty list 158 once.

In some embodiments, the truncation is performed by a truncation worker and the write back is performed by a write back worker on the same thread.

In some embodiments, after there is a hot page resulting in removal of entries from the dirty list but the associated records are not truncated from the journal, when additional records are added to the journal and the system performs truncation again starting from the journal tail, those records will now be truncated from the journal.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method, comprising:
maintaining a journal in a memory of a computing system including a plurality of records, wherein each record indicates a transaction associated with one or more pages in an ordered data structure;
maintaining a dirty list in the memory including an entry for each page indicated by a record in the journal, wherein each entry in the dirty list includes a respective first log sequence number (LSN) associated with a least recent record of the plurality of records that indicates the page and a respective second LSN associated with a most recent record of the plurality of records that indicates the page;
determining to truncate the journal, the truncation comprising removing one or more of the plurality of records from the memory;
identifying, based at least in part on the dirty list, one or more records, of the plurality of records, from the journal to write back to a disk, by:
obtaining a maximum LSN value for the journal truncation;
checking entries in the dirty list, starting from a least recent entry in the dirty list; and
determining whether the respective first LSN of the entry associated with the least recent record of the plurality of records that indicates the page is equal to or less than the maximum LSN value; and
writing back the one or more records to the disk.

2. The method of claim 1, wherein maintaining the dirty list comprises:
adding a record to the journal, wherein the record indicates a first page and a third LSN;
determining whether the dirty list includes an entry for the first page;
when the dirty list includes an entry for the first page, updating the respective second LSN in the entry to the LSN; and
when the dirty list does not include an entry for the first page, adding an entry to the dirty list including the third LSN as a respective first LSN indicating the least recent record of the plurality of records that indicates the first page and the third LSN as a respective second LSN indicating the most recent record of the plurality of records that indicates the first page.

3. The method of claim 1, wherein each entry in the dirty list is associated with a first pointer to a previous entry in the dirty list and a second pointer to a next entry in the dirty list.

4. The method of claim 1, further comprising:
when the respective first LSN of the entry is larger than the maximum LSN value:
refraining from writing back the respective record associated with the respective first LSN; and
stopping checking the entries in the dirty list.

5. The method of claim 1, further comprising:
when the entry is for a hot page:
skipping the entry; and
checking a next entry in the dirty list.

6. The method of claim 1, further comprising:
when the first LSN of the entry is equal to or smaller than the maximum LSN value:
writing back the respective record, associated with the first LSN, to the disk;
removing the entry from the dirty list; and
checking a next entry in the dirty list.

7. The method of claim 6, further comprising:
truncating the respective record, associated with the first LSN, from the journal.

8. The method of claim 1, further comprising:
determining to write back the one or more identified records and to refrain from truncating the one or more identified records from the journal when the one or more identified records are associated with at least one hot page.

9. The method of claim 1, wherein the ordered data structure comprises a copy-on-write (COW) B+ tree, and wherein the journal comprises a write-ahead log (WAL) for the COW B+ tree.

10. A system comprising:
one or more processors; and
non-transitory computer-readable medium comprising instructions that, when executed by one or more processors of a computing system, cause the computing system to perform operations comprising:
maintaining a journal in the memory including a plurality of records, wherein each record indicates a transaction associated with one or more pages in an ordered data structure;
maintaining a dirty list in the memory including an entry for each page indicated by a record in the journal, wherein each entry in the dirty list includes a respective first log sequence number (LSN) associated with a least recent record of the plurality of records that indicates the page and a respective second LSN associated with a most recent record of the plurality of records that indicates the page;
determining to truncate the journal, the truncation comprising removing one or more of the plurality of records from the memory;
identifying, based at least in part on the dirty list, one or more records, of the plurality of records, from the journal to write back to a disk, by:
obtaining a maximum LSN value for the journal truncation;
checking entries in the dirty list, starting from a least recent entry in the dirty list; and
determining whether the respective first LSN of the entry associated with the least recent record of the plurality of records that indicates the page is equal to or less than the maximum LSN value; and
write-writing back the one or more records to the disk.

11. The system of claim 10, wherein maintaining the dirty list comprises:
adding a record to the journal, wherein the record indicates a first page and a third LSN;
determining whether the dirty list includes an entry for the first page;
when the dirty list includes an entry for the first page, updating the respective second LSN in the entry to the LSN; and
when the dirty list does not include an entry for the first page, adding an entry to the dirty list including the third LSN as a respective first LSN indicating the least recent record of the plurality of records that indicates the first page and the third LSN as a respective second LSN indicating the most recent record of the plurality of records that indicates the first page.

12. The system of claim 10, wherein each entry in the dirty list is associated with a first pointer to a previous entry in the dirty list and a second pointer to a next entry in the dirty list.

13. The system of claim 10, the operations further comprising:
   when the respective first LSN of the entry is larger than the maximum LSN value:
   refraining from writing back the respective record associated with the respective first LSN; and
   stop checking the entries in the dirty list.

14. The system of claim 10, the operations further comprising:
   when the entry is for a hot page:
   skipping the entry; and
   checking a next entry in the dirty list.

15. The system of claim 10, the operations further comprising:
   when the first LSN of the entry is equal to or smaller than the maximum LSN value:
   writing back the respective record, associated with the first LSN, to the disk;
   removing the entry from the dirty list; and
   checking a next entry in the dirty list.

16. The system of claim 15, the operations further comprising:
   truncating the respective record, associated with the first LSN, from the journal.

17. The system of claim 10, the operations further comprising:
   determining to write back the one or more identified records and to refrain from truncating the one or more identified records from the journal when the one or more identified records are associated with at least one hot page.

18. A non-transitory computer-readable medium comprising instructions that, when executed by one or more processors of a computing system, cause the computing system to perform operations comprising:
   maintaining a journal in a memory of the computing system including a plurality of records, wherein each record indicates a transaction associated with one or more pages in an ordered data structure;
   maintaining a dirty list in the memory including an entry for each page indicated by a record in the journal, wherein each entry in the dirty list includes a respective first log sequence number (LSN) associated with a least recent record of the plurality of records that indicates the page and a respective second LSN associated with a most recent record of the plurality of records that indicates the page;
   determining to truncate the journal, the truncation comprising removing one or more of the plurality of records from the memory;
   identifying, based at least in part on the dirty list, one or more records, of the plurality of records, from the journal to write back to a disk, by:
      obtaining a maximum LSN value for the journal truncation;
      checking entries in the dirty list, starting from a least recent entry in the dirty list; and
      determining whether the respective first LSN of the entry associated with the least recent record of the plurality of records that indicates the page is equal to or less than the maximum LSN value; and
   writing back the one or more records to the disk.

19. The non-transitory computer readable medium of claim 18, wherein maintaining the dirty list comprises:
   adding a record to the journal, wherein the record indicates a first page and a third LSN;
   determining whether the dirty list includes an entry for the first page;
   when the dirty list includes an entry for the first page, updating the respective second LSN in the entry to the LSN; and
   when the dirty list does not include an entry for the first page, adding an entry to the dirty list including the third LSN as a respective first LSN indicating the least recent record of the plurality of records that indicates the first page and the third LSN as a respective second LSN indicating the most recent record of the plurality of records that indicates the first page.

20. The non-transitory computer readable medium of claim 18, wherein each entry in the dirty list is associated with a first pointer to a previous entry in the dirty list and a second pointer to a next entry in the dirty list.

* * * * *